US012629590B2

(12) United States Patent
Evdokimov

(10) Patent No.: US 12,629,590 B2
(45) Date of Patent: May 19, 2026

(54) INTERACTIVE ELECTRONIC DEVICE AND METHOD FOR INTERACTING THEREWITH

(71) Applicant: Dmitrij Vladimirovich Evdokimov, Moscow (RU)

(72) Inventor: Dmitrij Vladimirovich Evdokimov, Moscow (RU)

( * ) Notice: Subject to any disclaimer, the term of this patent is extended or adjusted under 35 U.S.C. 154(b) by 0 days.

(21) Appl. No.: 18/290,805

(22) PCT Filed: Jul. 14, 2022

(86) PCT No.: PCT/RU2022/000225
§ 371 (c)(1),
(2) Date: Jan. 22, 2024

(87) PCT Pub. No.: WO2023/219528
PCT Pub. Date: Nov. 16, 2023

(65) Prior Publication Data
US 2025/0128154 A1     Apr. 24, 2025

(51) Int. Cl.
*A63F 13/25*          (2014.01)
(52) U.S. Cl.
CPC .................................... *A63F 13/25* (2014.09)
(58) Field of Classification Search
CPC .......... A63F 13/25; A63F 13/24; G06F 3/023; G09B 5/00; G09F 9/30
USPC ........................................................ 463/32
See application file for complete search history.

(56) References Cited

U.S. PATENT DOCUMENTS

| | | | |
|---|---|---|---|
| 7,997,970 B2 | 8/2011 | Katz et al. | |
| 8,994,683 B2 | 3/2015 | Small et al. | |
| 10,592,004 B1 | 3/2020 | Sun | |
| 10,668,366 B2 | 6/2020 | Fu | |
| 11,779,833 B1 * | 10/2023 | Teel ..................... | A63F 9/0612 |
| 2009/0127785 A1 * | 5/2009 | Kishon ..................... | A63F 9/12 |
| | | | 273/157 R |
| 2018/0183587 A1 | 6/2018 | Won et al. | |

FOREIGN PATENT DOCUMENTS

| | | |
|---|---|---|
| CN | 106910376 A | 6/2017 |
| CN | 107682331 A | 2/2018 |
| RU | 2621182 C1 | 5/2017 |
| WO | 2008131613 A1 | 11/2008 |

(Continued)

*Primary Examiner* — Pierre E Elisca

(57) ABSTRACT

The claimed technical solution relates to the field of electronics, and more particularly to interactive devices that provide a novel functional three-dimensional format for games, learning, providing information, training different abilities, and the like. The technical result is that of allowing more efficient interaction with an interactive device by making it possible to press areas of a display that is formed by an array of buttons with transparent heads, which permit the display of graphic information. The claimed technical result is achieved by means of an interactive electronic device comprising a housing containing at least one processor and at least one memory, wherein on the outer surface of the housing there is a display that is formed by an array of buttons, each of which has a transparent head and forms a pixel of the display, said buttons enabling user interaction and the display of an image that is generated by the processor and output to the transparent heads of the buttons.

21 Claims, 12 Drawing Sheets

100

110

(56) References Cited

FOREIGN PATENT DOCUMENTS

| WO | 2017167741 A1 | 3/2017 |
| WO | 2017082966 A1 | 5/2017 |
| WO | 2018066362 A1 | 4/2018 |

* cited by examiner

100

110

100

110

105

110                                                    106

105

110                                                    106

105

106

107

110

106

107

110

105

108

110

105

108

INTERACTIVE ELECTRONIC DEVICE AND METHOD FOR INTERACTING THEREWITH

FIELD OF THE INVENTION

The claimed technical solution relates to the field of electronics, and more particularly to interactive devices that provide a novel functional three-dimensional format for games, learning, providing information, training different abilities, and the like. In addition to entertainment, the device can also be useful for therapeutic purposes: it can reduce anxiety, relieve nervousness, reduce excessive energy, act as an antistress tool. It can also help with impaired concentration, ADHD, autism spectrum disorder; the device also develops fine motor skills of the hands, teaches new things, develops logic, helps to cope with anxiety, trains the reaction. The device develops memory, and it is an excellent alternative to smartphone games, because it is less damaging for eye health.

BACKGROUND OF THE INVENTION

A device is known that represents a game cube (application US20190091559 A1, Mar. 28, 2019), which contains one or more displays placed on the faces of the cube, thus forming tiles to display information during user interaction.

The disadvantages of the known device are its limited use (only letter and number games), and lack of direct control of the selected pixel glow via pressing, because the device does not utilize a keyboard display. The device is controlled only by rotating the cube, and there is no exact point control of the image, while the full image is formed from tiles representing sufficiently large fragments, which leads to the fact that the user moves these large fragments along the sides of the cube without touching, thus, the movement of a single pixel is not possible. The number of image fragments is extremely small and cannot exceed the total number of display screens, so, for example, for a 3×3 cube there are only 54 such fragments, and the user can only interact with these large fragments of the image. The device is shaped like a cube. No glowing buttons are available.

A gaming device is known (application US20080070657 A1, Mar. 20, 2008), which is a cube that provides image output to tiles forming an area of display on the sides of the cube case.

This device does not create any image, but only glowing points, that is, the device does not have a keyboard display. The LEDs are hidden within the device and this significantly narrows down the number of possible games. The buttons are located in a narrow recessed chamber and the fingers of a large person will not fit into the chamber. The control is implemented only by pressing. The number of LEDs is extremely small, for example, there are only 6 of them in the described device. The device can only be used to play with the brightness of the LEDs. The user cannot set the brightness or color of the glow.

In addition, the disadvantage of existing devices is that a regular screen is easily damaged. If the display fails, the entire device stops working completely. Any regular display is a structurally complex element that always complicates the design. It cannot be repaired, and it only needs to be changed entirely as a separate spare part. The problem with the state of the art is the high probability of mechanical damage to a regular display during operation and the high probability of electronic malfunction. All this leads to higher production costs and increased repair costs for devices with a conventional display.

Thus, taking into account the disadvantages inherent in solutions known from the state of the art, a new type of device is proposed that provides a new principle of interaction and information processing due to the device display in the form of buttons, each of which represents a pixel for image creation.

SUMMARY

The claimed invention allows solving the technical problem inherent in solutions from the state of the art, in terms of creating an effective device for carrying out various types of activity with the possibility of directly displaying information on the device, while the user can interact with the device by reading responses on the display.

The technical result is that of allowing more efficient interaction with an interactive device by making it possible to press areas of a display that are formed by an array of buttons with transparent heads, which permit the display of graphic information.

The design of the claimed device is simplified, increasing its reliability and durability.

An additional result is increasing the accuracy of reading user interaction in various areas of the display, as well as the ability to scale the number of buttons forming the display.

The claimed technical result is achieved due to an interactive electronic device comprising a case;

at least one processor coupled with a memory device;

a display, which is made on the entire outer surface of the case, wherein the display formed by an array of closely spaced luminous buttons, each of which contains a transparent head and forms a display's pixel;

the buttons are made with the possibility of user interaction and displaying an image formed by the array of luminous buttons through a processor.

In one particular implementation, a button contains at least one LED.

In another particular implementation, at least one LED is located on the case.

In another particular implementation, at least one LED is located in a pixel.

In another particular implementation, the device additionally contains a sound module designed to reproduce audio signals.

In another particular implementation, the sound module is activated when at least one button forming the display is pressed.

In another particular implementation, the device additionally contains a light sensor.

In another particular implementation, the device additionally contains an accelerometer.

In another particular implementation, the device additionally contains a gyroscope.

In another particular implementation, the device additionally contains a GNSS module.

In another particular implementation, the device additionally contains a proximity sensor.

In another particular implementation, the device additionally contains a Hall sensor.

In another particular implementation, the device additionally contains a magnetometer.

In another particular implementation, the device additionally contains a temperature sensor.

In another particular implementation, the device additionally contains an ADC.

In another particular example implementation, the processor is designed to block user interaction with at least one part of the display.

In another particular implementation, the device additionally contains a radio wave transceiver.

In another particular implementation, the device additionally contains a device for generating vibrations.

The claimed device has a simple design, high reliability and durability, and does not have a fragile display that can be broken or punctured with a sharp object. A failed individual light pixel can be easily and inexpensively repaired separately by replacing the button with a light head.

The claimed technical result is also achieved due to a method of interaction with an interactive electronic device, wherein the interactive electronic device comprising a case;

at least one processor coupled with a memory device;

a display, which is made on the entire outer surface of the case, wherein the display formed by an array of closely spaced luminous buttons, each of which contains a transparent head and forms a display's pixel;

the buttons are made with the possibility of user interaction and displaying an image formed by the array of luminous buttons through a processor;

and the method contains the following steps:

receiving a user interaction by reading presses on the display using the processor;

activating an interactive game by the processor, during which an image is formed on at least part of the display;

reading of user interaction by the processor with the display during the interactive game;

wherein the interactive game displayed on at least part of the device display and is altered based on the processor's readings of user interactions with the buttons forming the display.

Unlike the known state of the art, the claimed technical solution does not have a screen as a separate built-in part, while there is an array of buttons and buttons form an image. A complete image is formed by buttons set close together and glowing in different colors. Using the buttons, the exact location of user presses on the image can be determined and controlled. The difference is also that the entire surface of the device is covered with a display with buttons on all sides and the entire surface of the device displays a picture from all sides. Moreover, each point of the display is sensitive to pressing anywhere and this creates interactive feedback between the device and the user. The buttons are elastic, and the user feels the elasticity and mechanical return when pushing the button.

DETAILED DESCRIPTION OF THE INVENTION

Figure 1:
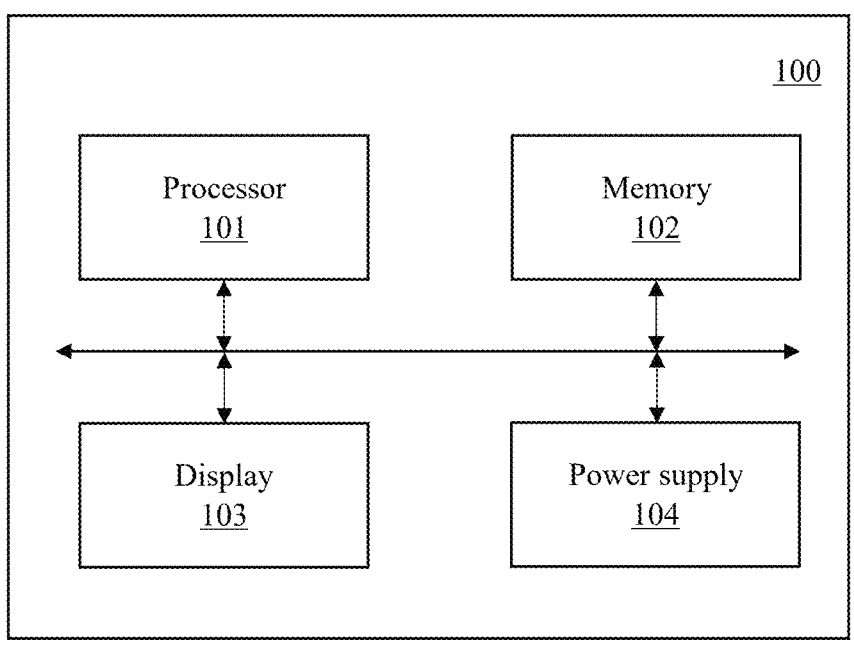
FIG. 1 illustrates the general scheme of the main components of the device.

As shown in FIG. 1, in general, the interactive device (100) contains the basic elements necessary for the implementation of key functions, which are one or more processors (101), memory (102), display (103) and power supply (104). The elements of the device (100) can be connected via a standard data bus or any other communication principle to ensure the transmission of signals and data.

As a processor (101) one or more microcontrollers (microprocessors) can be used, or another computing module, providing execution of program commands for the implementation of device functions (100). The processor (101) uses software to control all electronic components of the device (100) and receives the responses (data and signals) necessary for the operation of the device (100).

Memory (102) includes RAM and ROM, providing storage of instructions for execution by the processor, as well as long-term storage of information. Flash memory, SSD, HDD, etc. can be used as a ROM.

The device is powered by an integrated source (104), which is usually a battery.

The display (103) is a three-dimensional keyboard display, which is one or more displays covering the surface of the device (100). The display (103) covers the entire surface of the device.

Figure 2A:
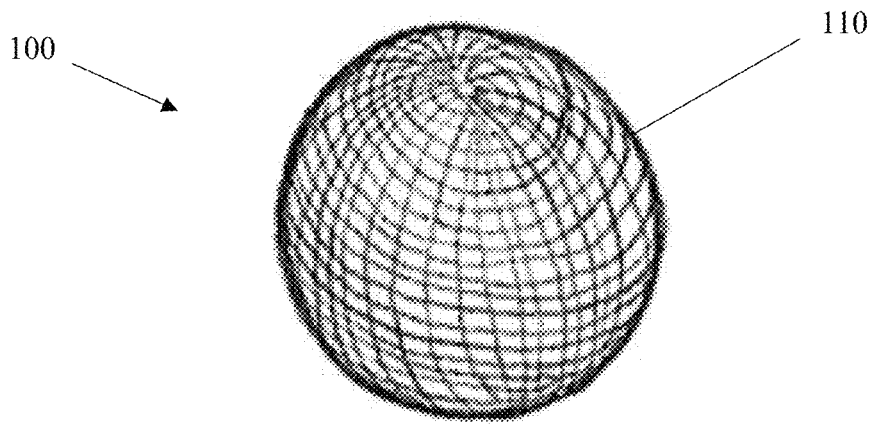
FIGS. 2A-2C illustrate possible implementations of the device case.
Figure 2B:
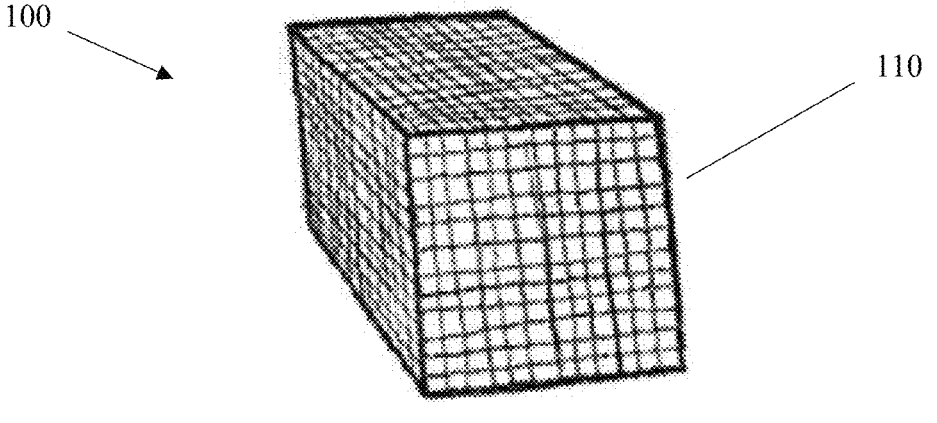
Figure 2C:
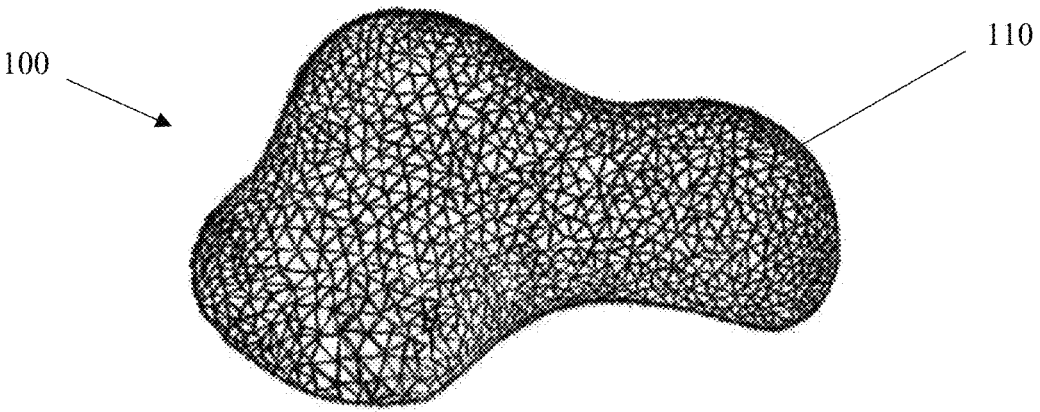

As shown in FIG. 2A-2B, the case of the device (100) can have a different shape, which is not limited to standard geometric shapes: cubic, spherical, curly, etc. The shape of the case can be different, while maintaining the possibility of placing the main components and the display (103) on at least one surface of it.

The display (103) covers the device from all sides, thus ensuring the possibility of interaction with each side.

Figure 3A:
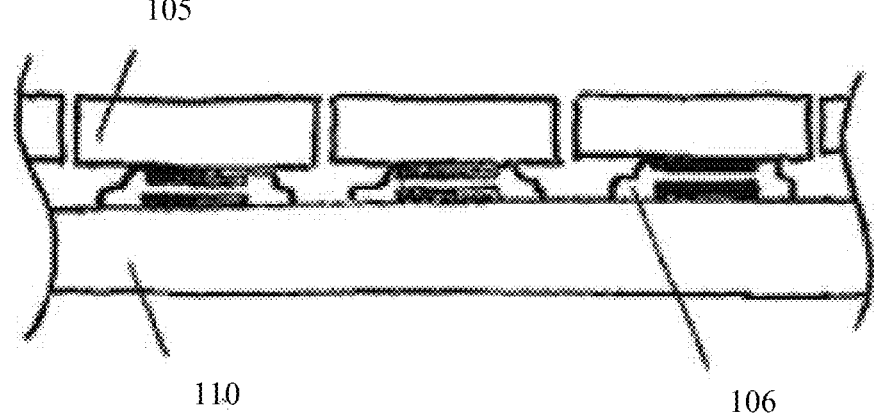
FIGS. 3A-3C show examples of implementation of display-forming buttons on cases of different shapes.
Figure 3B:
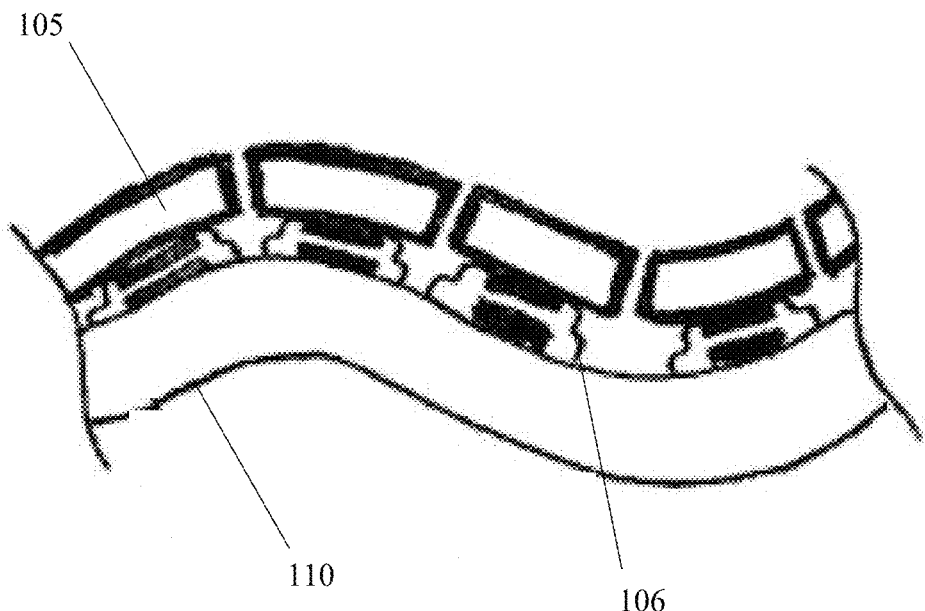
Figure 3C:
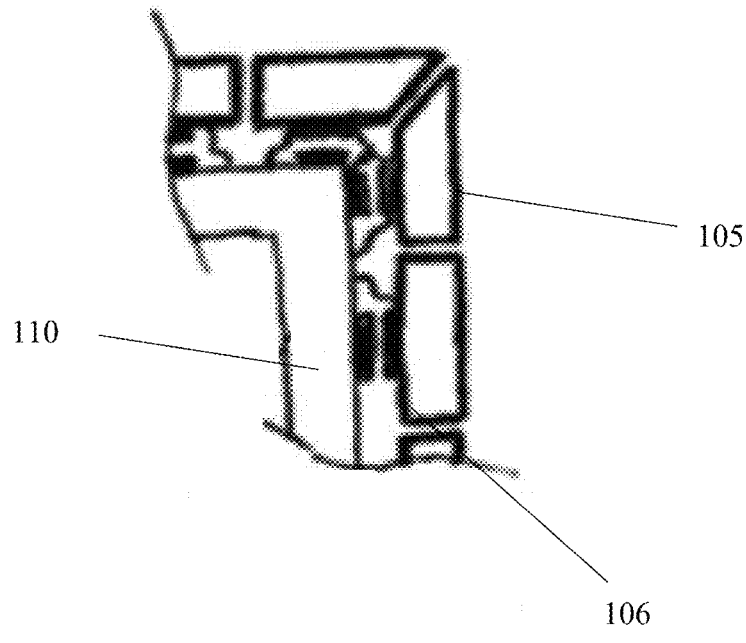

In FIG. 3A-3C the principle of forming the display (103) of the device (100) is shown in detail. The display (103) is formed from an array of glowing button heads (105) placed close to each other. Due to the buttons (106), the display (103) can determine the exact location of presses, which allows you to control the generated image (for example, animation, game, application, etc.) on the entire area of the volumetric display (103).

The display (103) has a unique design in the form of an array of buttons (106) with glowing transparent plastic heads (105), and each is a separate pixel that makes up a single large image on the display (103). Due to this configuration of the buttons (106), the entire display is sensitive to pressing at any point and this allows for feedback.

Figure 4A:
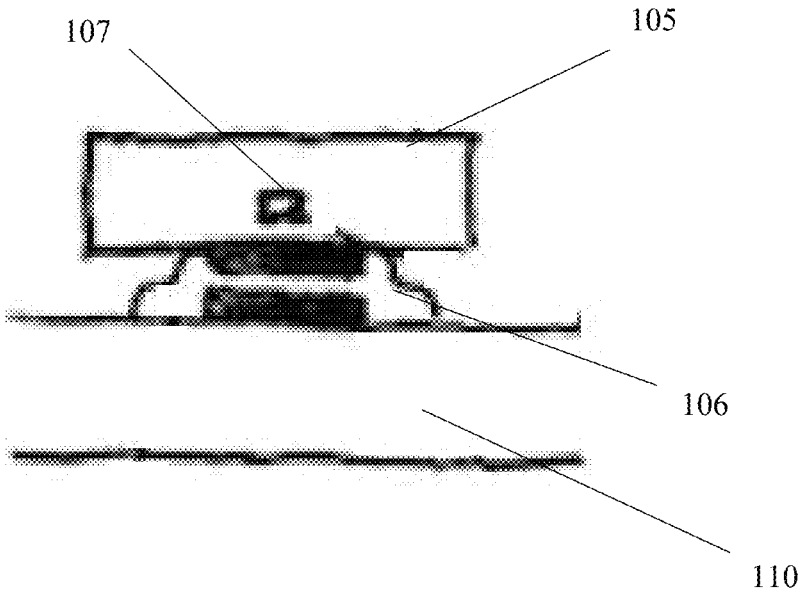
FIGS. 4A-4C illustrate examples of the placement of LEDs.
Figure 4B:
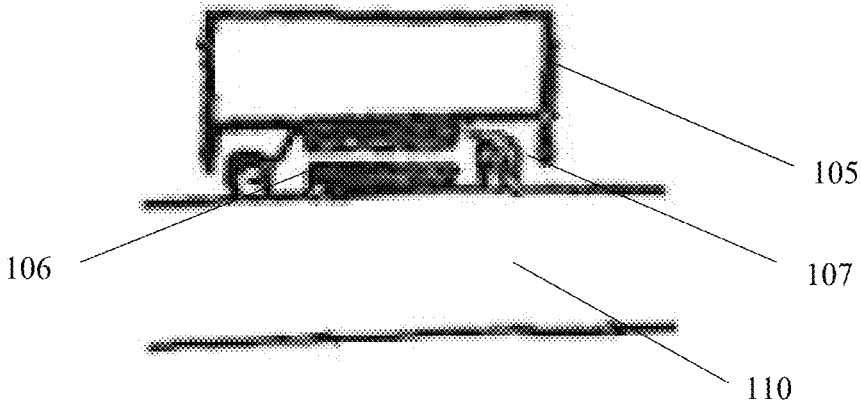
Figure 4C:
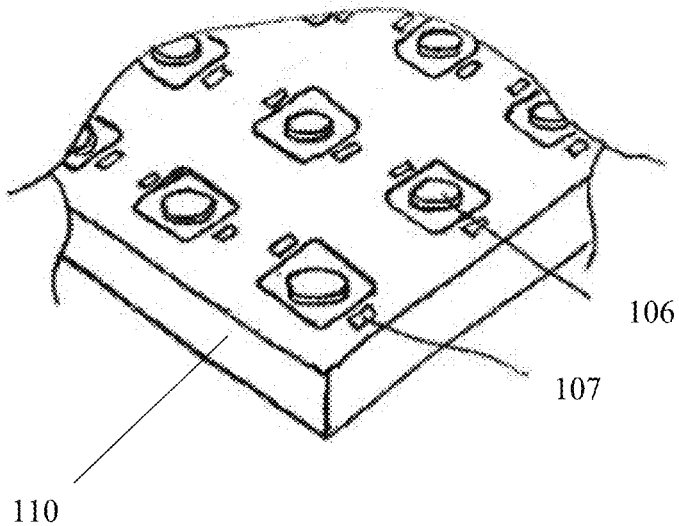

FIGS. 4A-4B show possible placement of LEDs (107), which provide illumination of the heads (105) of the buttons (106). The LEDs (107) can be placed directly in the transparent head (105), or next to the button itself (106) on the case (110) of the device (FIG. 4B). Number of LEDs (107) can be different in the head (105) or next to the button (106).

Figure 5A:
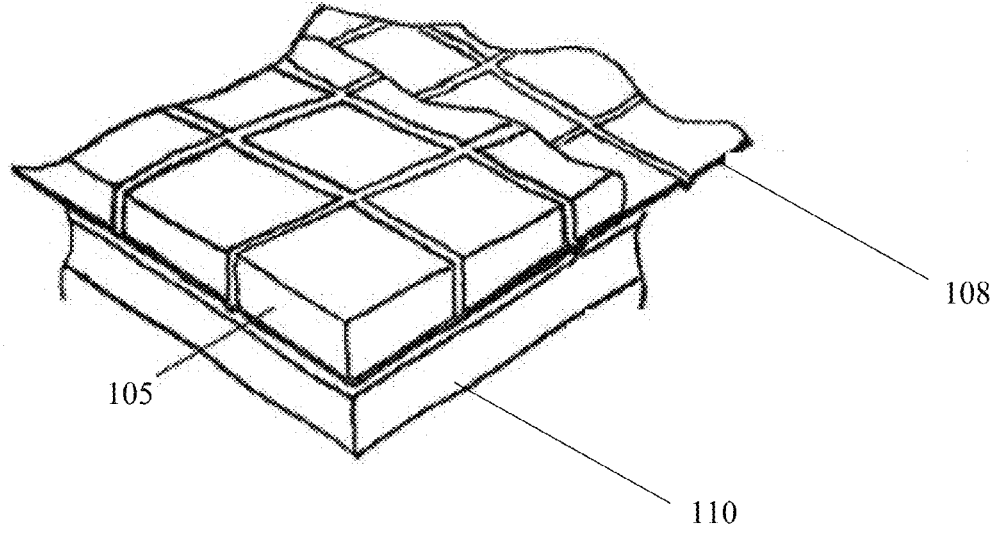
FIGS. 5A-5B show possible uses of an elastic film.
Figure 5B:
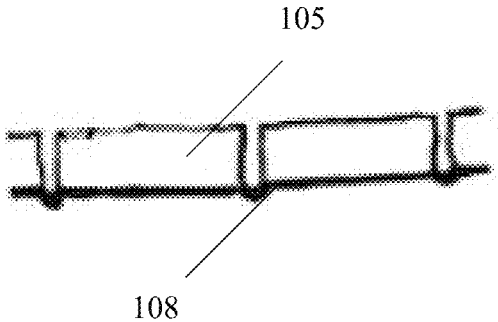
Figure 6A:
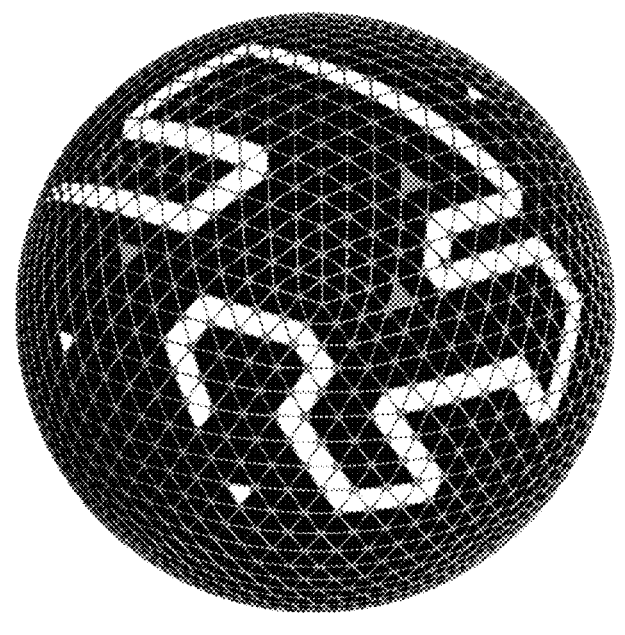
FIGS. 6A-6I illustrate examples of device implementations with various interaction programs.
Figure 6B:
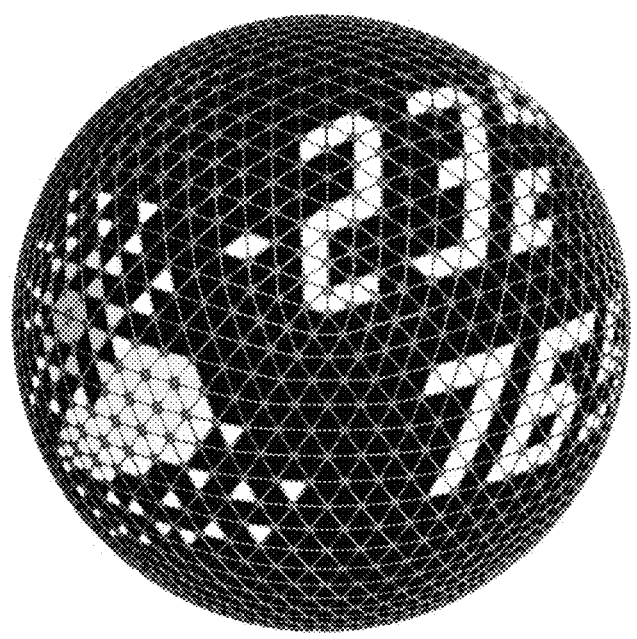
Figure 6C:
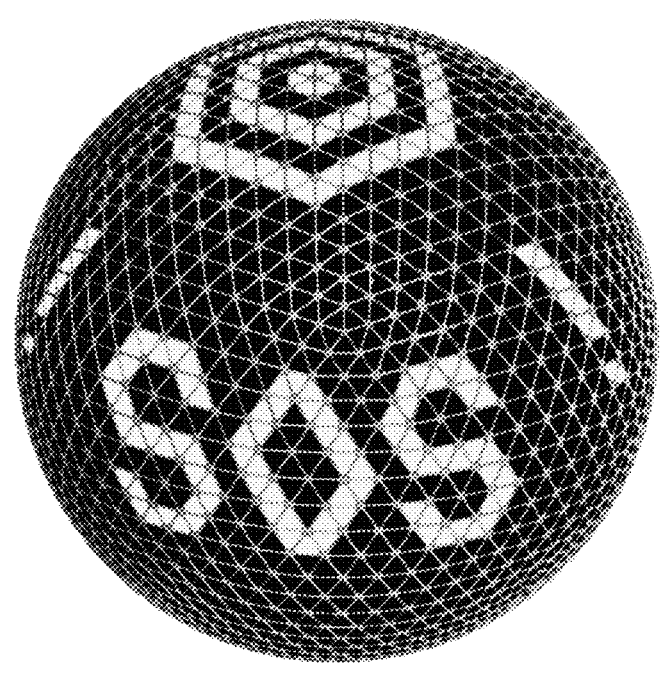
Figure 6D:
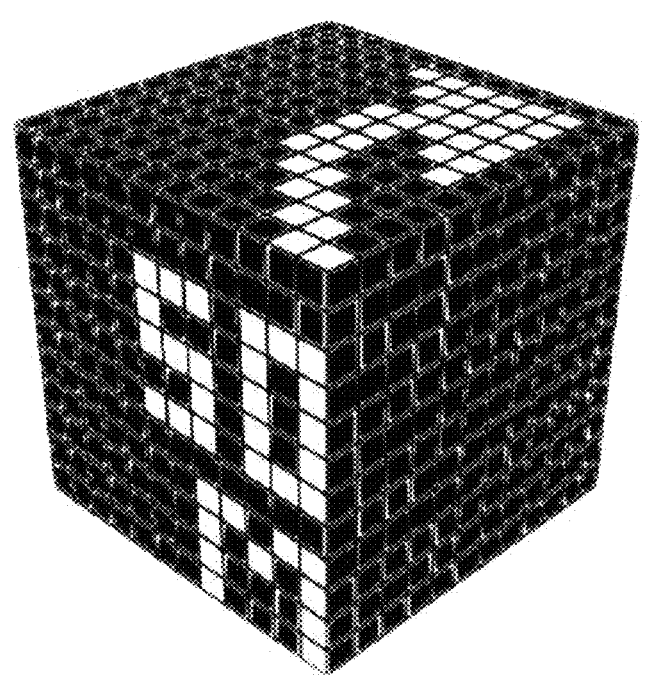
Figure 6E:
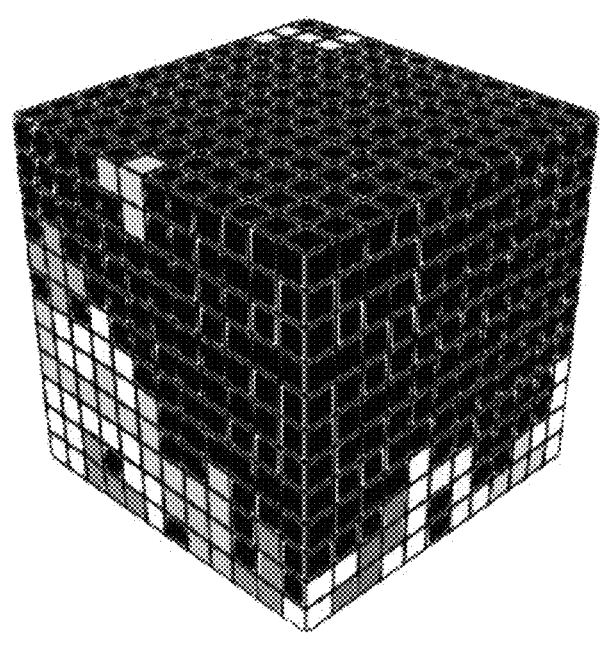
Figure 6F:
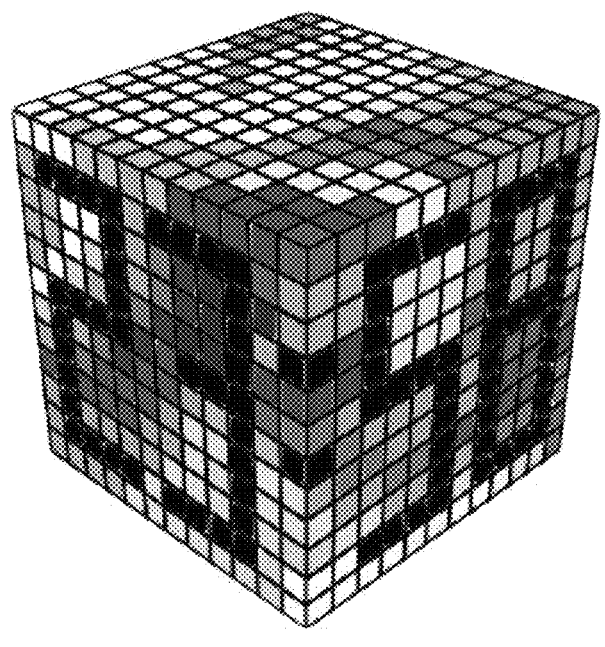
Figure 6G:
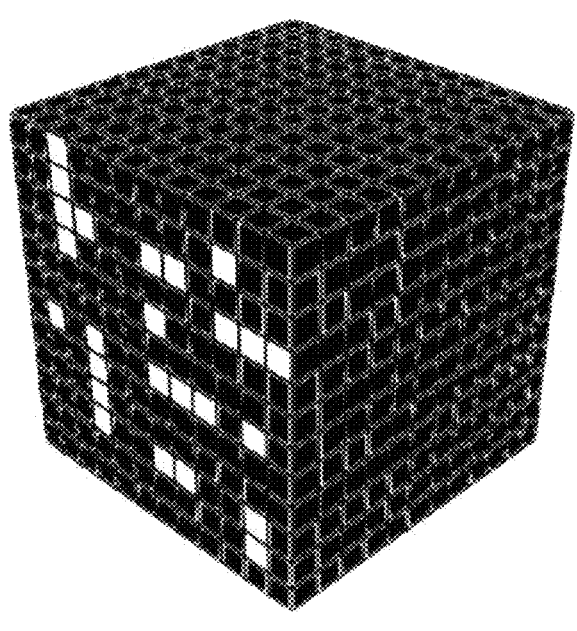
Figure 6H:
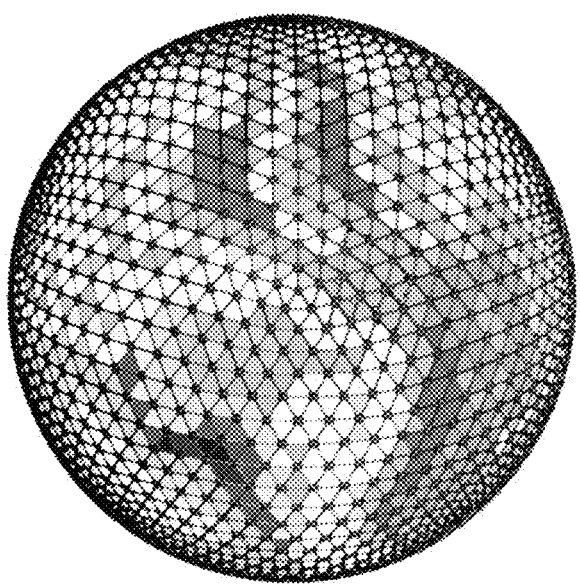
Figure 6I:
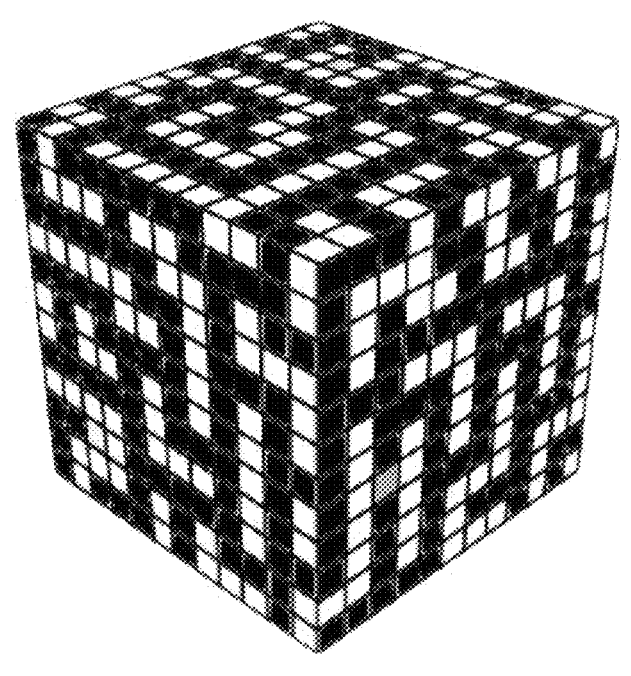

FIGS. 5A-5B show a particular implementation of the device (100), in which the button heads (105) can be covered with an elastic film (108), which serves as a barrier against dust and moisture, but does not prevent interaction with the buttons (106) of the display (103).

As additional sensors or elements of the device (100), a sound module, a light/illumination sensor, an accelerometer, a gyroscope, a GNSS module, a proximity sensor, a Hall sensor, a magnetometer, a temperature sensor, a radio wave transceiver, a wireless communication transceiver, a vibration generator, etc. can be used.

The sound module can be speakers, or an audio processor coupled with audio output means.

The light/illumination sensor provides a response to the degree of illumination of the surrounding space in order to perform a given program scenario.

The accelerometer and gyroscope can detect the position and movement of the device (100) in space during its tilt, rotation, and other types of position changes.

The GNSS module is a standard solution regarding the need to receive satellite coordinates using GPS, GLONASS, BeiDou and others protocols.

The proximity sensor provides a response in case the device (100) approaches any object.

The Hall sensor measures the magnetic field, thereby allowing you to control the display (103) or the gameplay. The above sensor also improves geo-positioning.

The magnetometer provides measurements of the Earth's magnetic field.

The temperature sensor can be used to measure ambient temperature, humidity, air thinness, etc.

The radio wave transceiver and/or a wireless communication transceiver can be used to receive radio signals, as well as to provide a wireless data exchange channel with external connected devices via a communication protocol, for example, Bluetooth, NFC, Wi-Fi, BLE, RFID and others.

The vibration generation device can be implemented in the form of vibration elements, for example, vibration cells that create vibration.

The ADC can also be used in the device (100) to provide the conversion of data from sensors into digital form for transmission to the processor (101).

The device (100) can be engaged in different ways: contact (pressing, tilting, shaking, or bumps) and non-contact (light, sound, or radio wave). Such impacts can come from both the user (pressing, voice, and moving), and the external environment (radio waves, sound, light, or vibration). The claimed solution is not limited to the above-mentioned ways of engagement. All impacts are detected by the device sensors, which provide the signals entering the processor (101).

The data coming from the processor (101) sends an individual control signal for each of the buttons (106) on the surface of the device (100), in particular, what color and how intensively each head (105) of each button (106) needs to light up. All the buttons (106) form a single display (103) consisting of individual pixels from the luminous heads (105) of the buttons (106) set next to each other. Thus, the processor (101) generates an image on the keyboard display (103).

Due to the large number of pixels formed by the heads (105) of the buttons (106), the display (103) can create various types of images, for example, readable letters, numbers, pictures, animations or videos. The processor (101) also controls all additional and basic elements of the device (100), which ensures continuous two-way interaction between the user and the device (100). When impacting the device (100), the user receives a reaction. For example, by pressing the button (106) on the display (103), you can change the course of the game, or change the image, or the place of pressing will become a new movement direction of the object on the screen. Examples of practical interaction with the device (100) will be disclosed further in these application materials.

In the passive state of the device (100) it can be in standby mode, in which the display (103) is turned off or a screensaver is running. Activation is possible by pressing certain points of the device (100). For example, such points can be lit up briefly by shaking the device (100). If the points are not pressed during the allotted time, the device (100) switches back to standby mode.

It is also possible that the activation of the device (100) is carried out by voice or other impact. After turning on the device (100), it can show available functions on the display (103) in the form of images. The desired game or function can be selected on the screen (103) at the time of the demonstration, or, knowing its name or number, you can also immediately switch to the specified game or function using voice control or by pressing the buttons (106) of the display (103). The device (100) has a robust case without any vulnerable protruding or rotating parts, which provides increased reliability and durability. The case can be dust- and moisture-proof.

The mechanical reaction of the buttons on the display (103) gives the user a new pleasant feeling, compared to touch-screen displays, providing a new format of the gaming space and a new kind of portable electronic digital device for entertainment and education. In the claimed invention, when using a keyboard display, a person gets a completely new feeling: tactile, physical movement of the button felt by the muscles of his or her fingers when pressing on it and then the pressure on the finger when the button pushes the finger back to the initial level due to the built-in spring. Thus, the movement of the button down and up gives the user the opportunity to experience a new tactile feeling. And these sensations of physically pushing through a luminous display, or rather, the sensations of tactile button pressing, are a completely new solution for multi-pixel displays that are able to show a complex high-quality image (pictures, video or text).

Also, when interacting with the device (100), it is possible to block a certain part of the display (103), which makes it possible to exclude false reading (pressing) on that part (or parts) of the device (100) that are not involved in the process of forming a response. As an example, when working with a device with two hands, holding it in the air, the display areas (103) in contact with the user's hands will be blocked, and only the active part or parts of the display (103) will remain available for interaction.

The device (100) constantly monitors its own position in space and, with any rotation, the position of the back and user sides of the volumetric display (103) is monitored.

Figure 8:
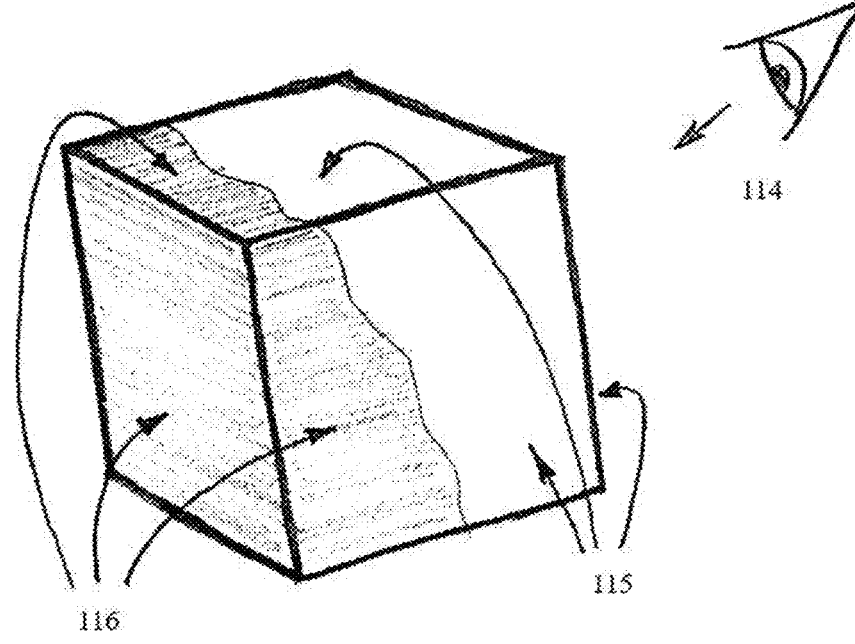
FIG. 8 illustrates the exclusion of false taps on the device.

Two ways have been developed for the device (100) to avoid accidental presses from the supporting hand:

a) Possible inactive zones are shown on the display and the user selects the desired zone by simply pressing the buttons along its limits. After that, the device position sensor promptly detects the reverse side of the display (116) and the user side (115), and monitors and disables it at any rotation of the device. If the user is standing and looking (114) at the device from above, then the bottom is turned off. If the user is sitting and looking (114) at an angle, then the opposite part is turned off at the same angle. If the user is lying and holding the device above, then the back side will be the top of the device, and it will be turned off (FIG. 8);

b) It is also possible to avoid impacts from the supporting hand using artificial intelligence logic, when the device determines which presses are due to the fact of holding the device, and which are intentional user actions necessary to control the device. False presses from the supporting hand are completely ignored. And the position of the device in space in this implementation is not important at all.

Another feature of the claimed invention is that the device (100) can have a free, unoccupied interior space. This allows you to place other devices or objects completely different in purpose inside it, for example: wireless headphones, photo/video cameras, glucose meters, pulse oximeters, walkie-talkie, alarm system, security system, radio babysitter, registrar, a power bank battery, a speaker, a thermometer; a barometer; a breathalyzer, etc.

The device (100) can have openable parts (caps (111, 112)) to access the inner space. Such a structure allows to use the internal space to accommodate various additional built-in devices and objects with different functions and with separate access to them.

All additional devices or objects have the same overall size to fit in the inner space. They can also have a single contact point if necessary. Any additional device is simply slid into the body of the claimed device (100) and is automatically connected via a universal connector to the power supply and processor.

Figure 7:
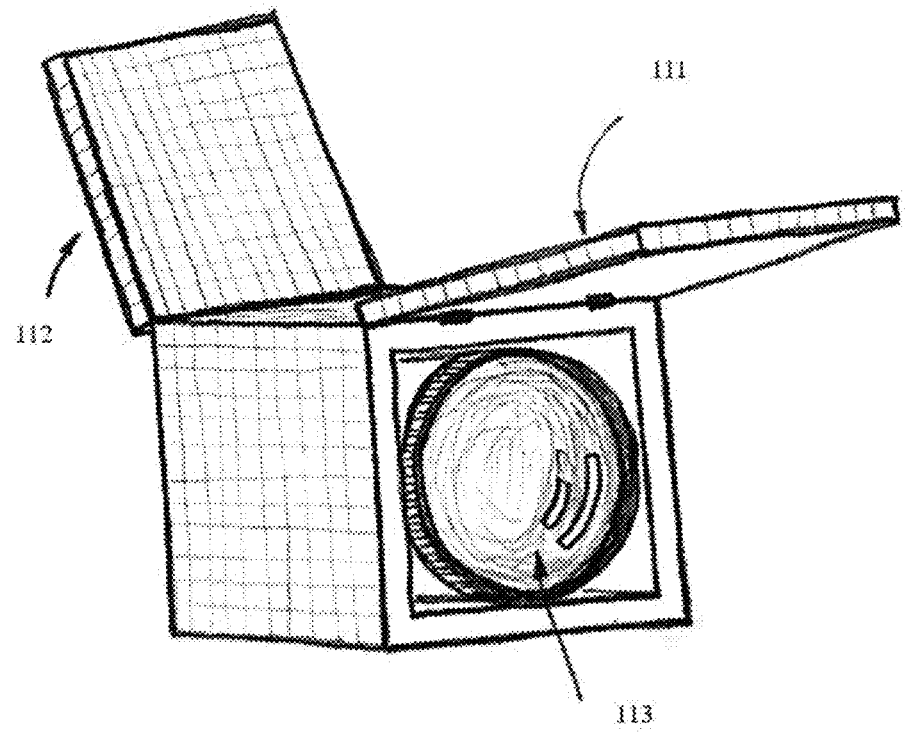
FIG. 7 shows a possible way of using the internal cavity of the device.

As an example, a device (100) with a photo-video camera (113) built into the inner cavity is shown (FIG. 7). One of the caps (112) has a built-in video display on the inside, and the second cap (111) becomes a sun visor for the lens when opened. The camera (113) turns on automatically when the lens cap (111) is opened. The other cap (112), turned to the user from the inside, has a video touchscreen on which the image from the camera is broadcast, and recording data is displayed on the same screen, which the user can control via the touchscreen display. The main functions of starting and stopping video recording and shutter release are duplicated to the external volumetric display (103) of the device (100), which is very convenient and you can record by opening the lens cover (111) with the back cap closed (112). After recording, you can view the footage with sound on the built-in internal display. The recording is done on a removable flash card.

The electronic device with a three-dimensional display (103) works as follows: Inside the device there is a micro-processor, a power supply, and sensors. They are connected to a three-dimensional display located on the surface of the device (103). The microprocessor generates an image on the display (103), which can occupy up to the entire surface area of the device. The overall view of such a three-dimensional image becomes clear if you look at the device screen from all sides. There are light elements on the surface of the device that can form an image. The user can control the functions of the device with one or more impacts:

pressing, tilting, shaking, sound, light, radio waves, moving in space, and others. The surface of the device consists of mechanical micro-buttons with luminous heads, which, being close to each other, form a continuous smooth cellular surface, which becomes a screen on which a pixel image can be formed. An important feature of this electronic device is its interactivity. For example, by pressing a button on the device's display, you can change the course of the game or the image, or this press will be regarded as the selected direction of movement of the object on the screen in the direction of pressing. The user can perform other actions in a similar way. The device is designed in a robust case and does not have any protruding or rotating parts, which provides increased reliability and durability.

FIG. 6A-6I shows some examples of interaction with the device. Several cases of interaction with the claimed invention will be discussed below.

Snake (Game)

On the display (103), a point of light moving in a straight line appears at any place. Light pixels (105) light up and go out sequentially on the surface of the display (103), creating the movement effect. In the same place, fixed luminous dots appear on the display (103), which need to be "eaten" by a moving snake, and its length increases. The goal of the game is to collect as many points as possible and not cross the tail of your snake, which will lead to the game being over. The game picture on the display (103) is formed by a program loaded into the memory (102) of the device and executed by the processor (101). The user sees this picture on the screen (101) and directs the movement of the snake in the direction he or she sees fit, interacting with the pixels (105) through the buttons (106). To do this, the user presses on the surface of the display (103) from the side where the snake needs to turn. It doesn't matter which pixel is pressed; the only important thing is the position of this pixel in relation to the snake's head.

The signal from the pressed button (106) enters the processor (101) and this gives a response signal to the snake to move in that direction. The signal from the processor (101) is sent to the display (103), providing activation of the LEDs (107), which highlight the movement of the snake in the right direction. In case of crossing the snake's tail, the program recognizes this situation as game over and displays (103) the number of points.

During the game, it does not matter how many sides the device has (100) all faces or sides are considered a single three-dimensional display (103). The game image is formed by the processor (101) immediately on the entire area of the three-dimensional display (103), or only on the part that is facing the user due to the function of avoiding false presses on the device (100).

Battleship (Game)

You can play it with a partner who has a similar device (100) and then digital data between the devices is transmitted over the radio channel and the processors (101) of the devices will maintain a single logic of the game.

You can play together on the same device (100). To do this, the picture of the battle is drawn on opposite sides of the three-dimensional display (103). You can also play alone. Then the opponent for you will be the logic of the processor.

At the beginning of the game, the user draws his or her "ships" on the surface of the display (103) by pressing the desired pixels (105). Unlike the Snake game, this game tracks the exact comparison of the pressed pixel and the glowing pixel. Only the pixel (105) of the button (106) pressed is lit up. This logic is used in any situation for a given game. The button (106) and the corresponding pixel (105) become a "shot", and then it is checked whether there is an enemy ship at this point or not. If it hits, then this pixel (105) lights up red and an explosion sound is played, and if it a miss, then this pixel flashes red, then goes out and a splash of water is heard.

Tetris®

This famous game is especially interesting on this device because the game is played on a three-dimensional display (103) and the figures need to be stacked from all sides. The movement of the figures and their rotation can be controlled simultaneously by different impacts: both by pressing on the display and by tilting the device.

Globe (Educational Program)

A device (100) of any shape shows a physical map of the world over the entire area of its display (103). If the shape of the device is spherical (FIG. 6H), then the user sees the globe of the Earth. The device (100) calls a geographical object (continent, country, city, sea, mountain, etc.), and the user must press the corresponding place on the globe. The device (100) keeps track of the accuracy and evaluates the user's knowledge in points. The device (100) with such a program can also be used as a means for testing in educational institutions.

Maze (Game)

The device (100) forms an arbitrary maze on the entire surface of the three-dimensional display (103). A unique feature is that the maze is endless due to the fact that it covers the device (100) from all sides and, accordingly, the maze has no borders and no outer walls. No other known device can provide a similar game scenario. You can control the passage through the maze by pressing the display (103) or tilting the device (100). The goal of the game is to reach the treasure in the shortest possible time. It is possible to play on the same virtual field by several users on several devices of the same type (100), when everyone plays on their own device (100) and everyone sees their opponents' colored dots on their maze. To perform that, all devices (100) communicate over the radio channel and the processors of the devices (100) coordinate the movements of all players on a single playing field. The game develops spatial thinking, strategy, and intuition.

Catch the Hare (Game)

A bright white spot randomly runs around the display (103) of the device (100) on all sides. It stops, jumps sideways to the other side of the device (100), runs on, changing speed non-linearly. By quickly rotating the device (100), the user should track this spot with his eyes as quickly as possible and catch up with the hare by pressing on it. Each new stage complicates the chase: the speed and randomness of the movement of the hare increase. The game trains fine motor skills, attentiveness, and reaction.

The invention claimed is:

1. An interactive electronic device comprising
a case;
at least one processor coupled with a memory device;
a display, which covers the entire outer surface of the interactive electronic device, wherein the display formed by an array of closely spaced luminous buttons, each of which contains a transparent head and forms a display's pixel;
the buttons are made with the possibility of user interaction and displaying an image formed by the array of luminous buttons through a processor.

2. The device according to claim 1, wherein the button contains at least one LED.

3. The device according to claim 2, wherein the LED is placed on the case.

4. The device according to claim 3, wherein pixel of the display contains at least one LED.

5. The device according to claim 1, additionally containing a sound module to reproduce audio signals.

6. The device according to claim 5, wherein the sound module is activated when at least one button forming the display is pressed.

7. The device according to claim 1, additionally containing a light sensor.

8. The device according to claim 1, additionally containing an accelerometer.

9. The device according to claim 1, additionally containing a gyroscope.

10. The device according to claim 1, additionally containing a GNSS module.

11. The device according to claim 1, additionally containing a proximity sensor.

12. The device according to claim 1, additionally containing a Hall sensor.

13. The device according to claim 1, additionally containing a magnetometer.

14. The device according to claim 1, additionally containing a temperature sensor.

15. The device according to claim 1, additionally containing an ADC.

16. The device according to claim 1, wherein the processor blocks the reading of user interaction from at least one part of the display.

17. The device according to claim 1, additionally containing a radio wave transceiver.

18. The device according to claim 1, additionally containing a device for generating vibrations.

19. The device according to claim 1, additionally containing a device position sensor to deactivate a certain part of the display.

20. The device according to claim 1, additionally containing an artificial intelligence to deactivate a certain part of the display.

21. A method of interaction with an interactive electronic device, wherein the interactive electronic device comprising
a case;
at least one processor coupled with a memory device;
a display, which covers the entire outer surface of the interactive electronic device, wherein the display formed by an array of closely spaced luminous buttons, each of which contains a transparent head and forms a display's pixel;
the buttons are made with the possibility of user interaction and displaying an image formed by the array of luminous buttons through a processor;
and the method contains the following steps:
receiving a user interaction by reading presses on the display using the processor;
activating an interactive game by the processor, during which an image is formed on at least part of the display;
reading of user interaction by the processor with the display during the interactive game;
wherein the interactive game displayed on at least part of the device display and is altered based on the processor's readings of user interactions with the buttons forming the display.

* * * * *